Nov. 2, 1943. V. E. WHITMAN 2,333,501
TRIPOD PARTICULARLY APPLICABLE TO PHOTOGRAPHIC CAMERAS
Original Filed Jan. 27, 1941 4 Sheets-Sheet 1

Inventor:
Vernon E. Whitman
Attys

Nov. 2, 1943.    V. E. WHITMAN    2,333,501
TRIPOD PARTICULARLY APPLICABLE TO PHOTOGRAPHIC CAMERAS
Original Filed Jan. 27, 1941    4 Sheets-Sheet 2
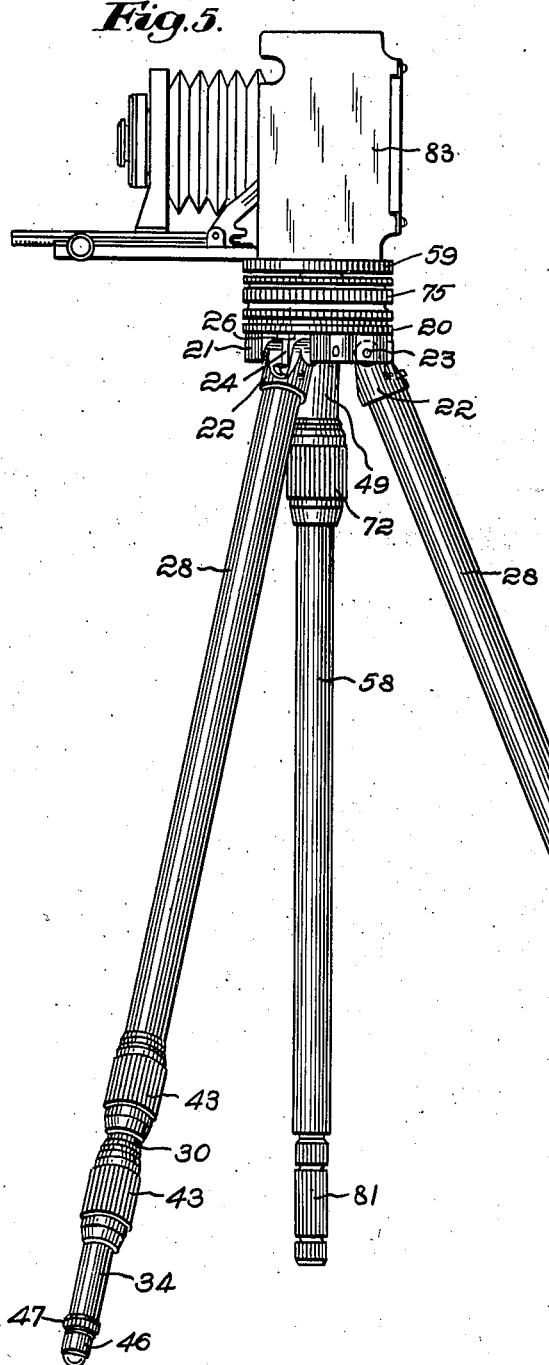
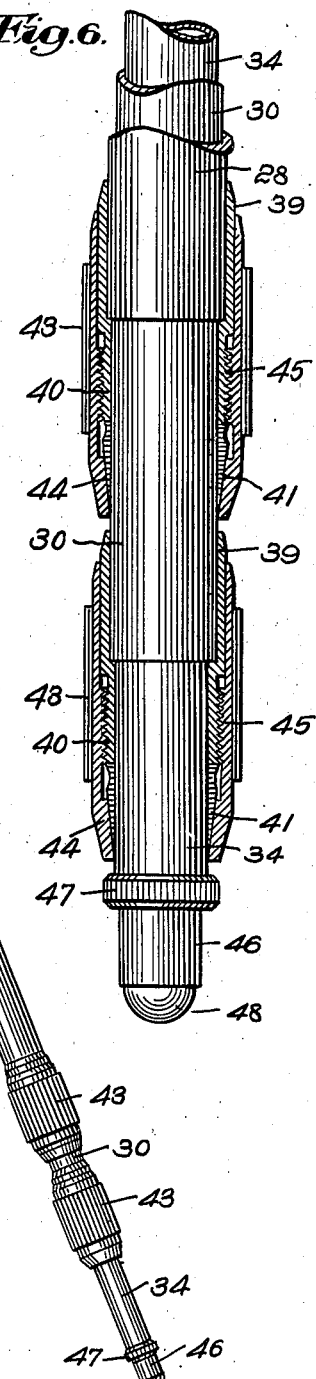
Inventor:
Vernon E. Whitman Nov. 2, 1943.    V. E. WHITMAN    2,333,501
TRIPOD PARTICULARLY APPLICABLE TO PHOTOGRAPHIC CAMERAS
Original Filed Jan. 27, 1941    4 Sheets-Sheet 3
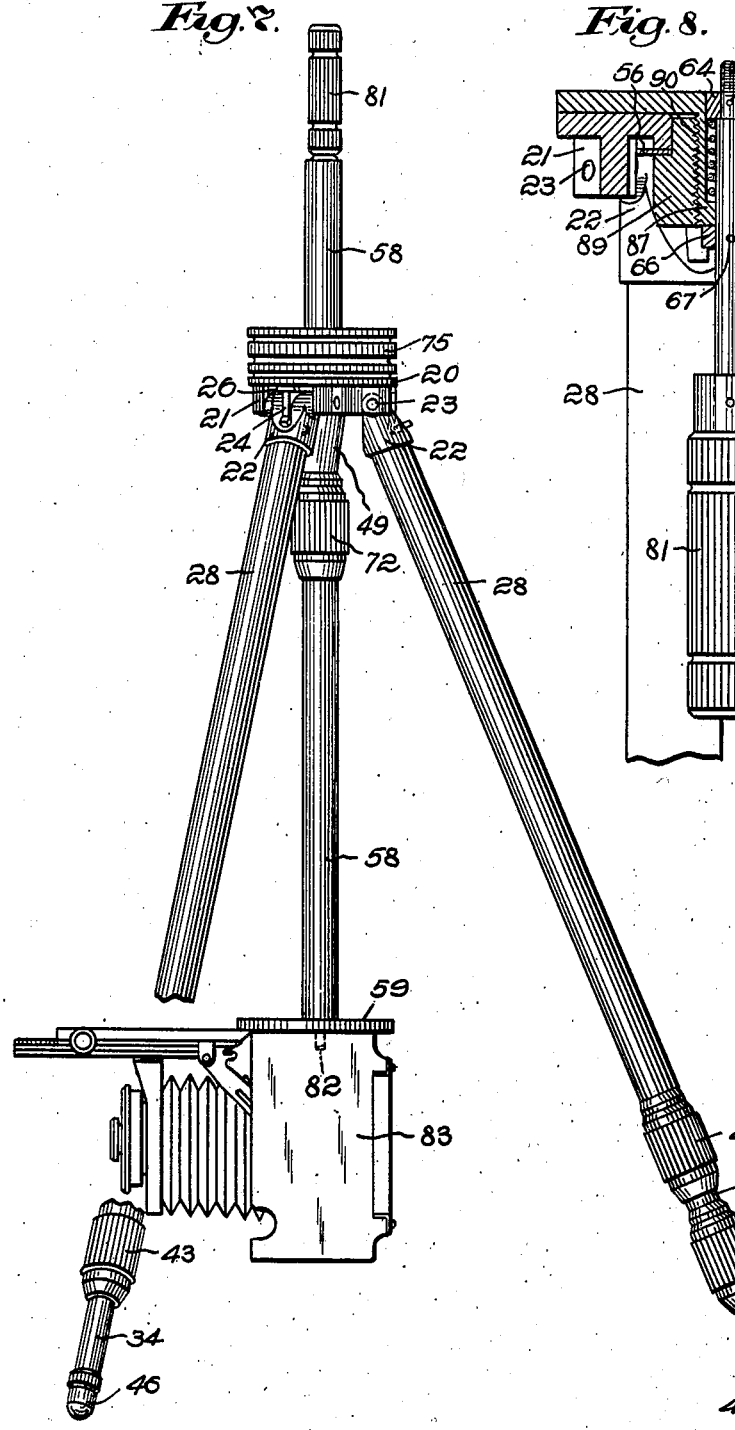
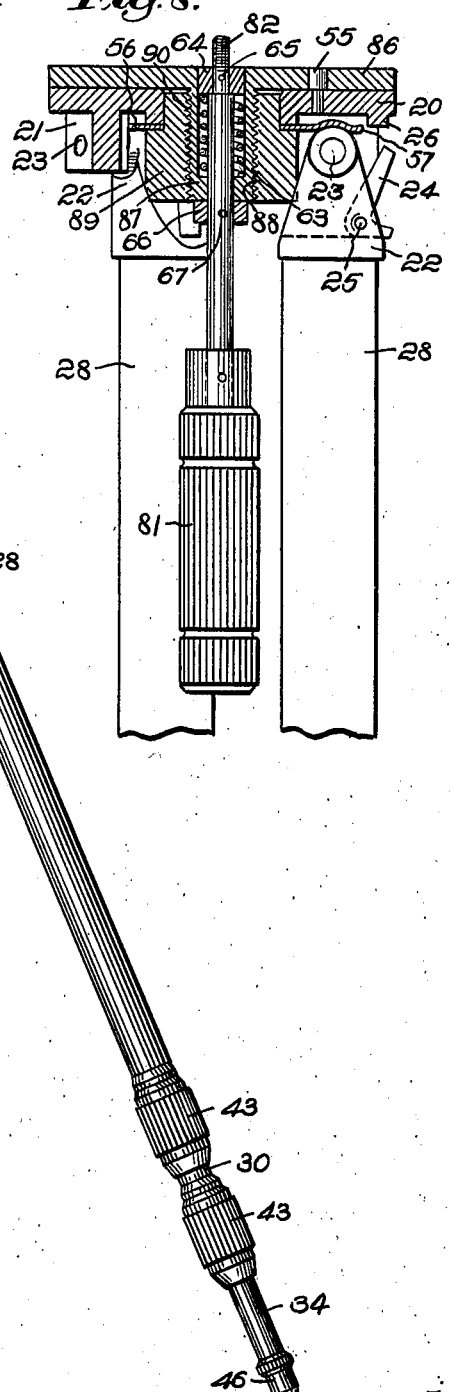
Inventor:
Vernon E. Whitman.
by Emery, Booth, Townsend, Neth and Jashen Attys.

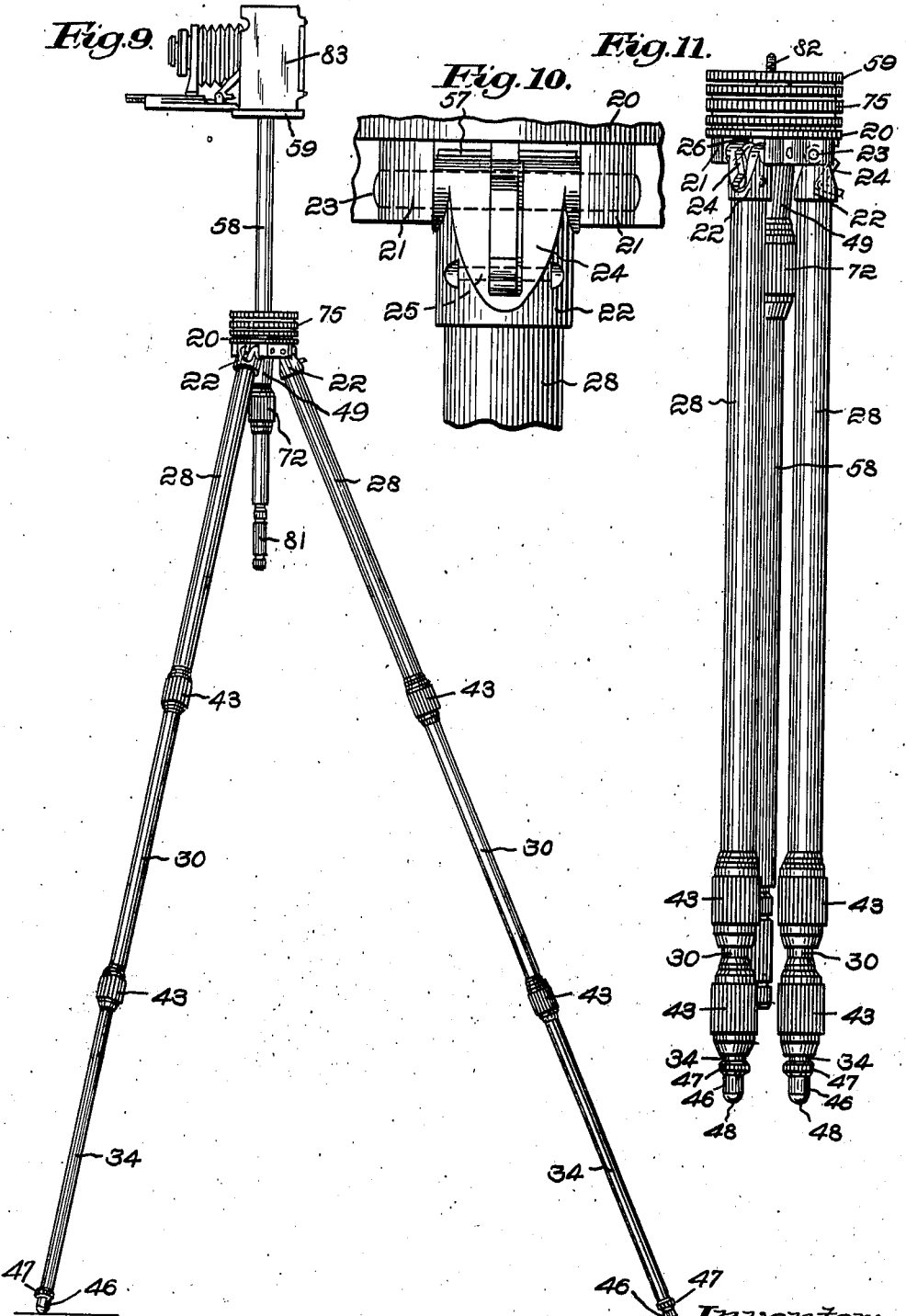

Patented Nov. 2, 1943

2,333,501

UNITED STATES PATENT OFFICE 2,333,501

TRIPOD PARTICULARLY APPLICABLE TO PHOTOGRAPHIC CAMERAS

Vernon E. Whitman, Rochester, N. Y., assignor to The Folmer Graflex Corporation, Rochester, N. Y., a corporation of Delaware Original application January 27, 1941, Serial No. 376,018, now Patent No. 2,297,927, dated October 6, 1942. Divided and this application September 4, 1942, Serial No. 457,284

9 Claims. (Cl. 248—188)

This application is a division of my co-pending application Ser. No. 376,018, filed January 27, 1941, now Patent No. 2,297,927, dated October 6, 1942.

This invention relates to tripods particularly adapted for use with photographic cameras.

In order that the principle of the invention, which is directed to an all-metal tripod, may be readily understood, I have disclosed a single embodiment thereof, and also a slight modification, in the accompanying drawings, wherein Fig. 1 is a vertical cross section through the tripod with the legs folded for packing, showing the construction of the several parts;

Fig. 5 is an elevation of a tripod having a camera attached thereto, the legs being adjusted for a low position of the tripod;

Fig. 6 is a detail partially in vertical section, showing the construction of the leg tubular members and clamping means therefor;

Fig. 7 is an elevation of the tripod showing the vertically extending member reversed to support a camera below the tripod head;

Fig. 8 is a side elevation of the tripod when in a folded condition, being partially in vertical section, to show the tripod adapted for use when the vertically extending member is not provided;

Fig. 9 is a side elevation of the tripod having the legs fully extended and the vertically extending member also partially extended;

Fig. 10 is an enlarged detail in elevation of a part of the tripod head, showing the hinge member of one of the tripod legs; and Fig. 11 is an elevation of the tripod when completely folded.

There has long been need for an all-metal tripod strongly constructed, and foldable into a compact package, and at the same time having sufficient adjustment so that a camera may be supported thereon within a few inches from the floor or six feet or higher above the floor. Such needs are supplied by the invention herein disclosed.

Among the objects of the invention are to provide a tripod having a centrally extending member, so as substantially to increase its over-all height; to provide adjustable legs that, when clamped into position, are free from shake and slipping; to provide a tripod with means for positioning the legs at a predetermined distance from the center of the tripod so as to prevent spreading of the legs when weight is placed on the tripod; and to provide a head for the tripod having hinged legs pinned thereto, together with means to provide fixed tension on the legs with respect to the tripod head at all times.

As above indicated, the tripod is herein disclosed as an all-metal tripod.

Figure 1:
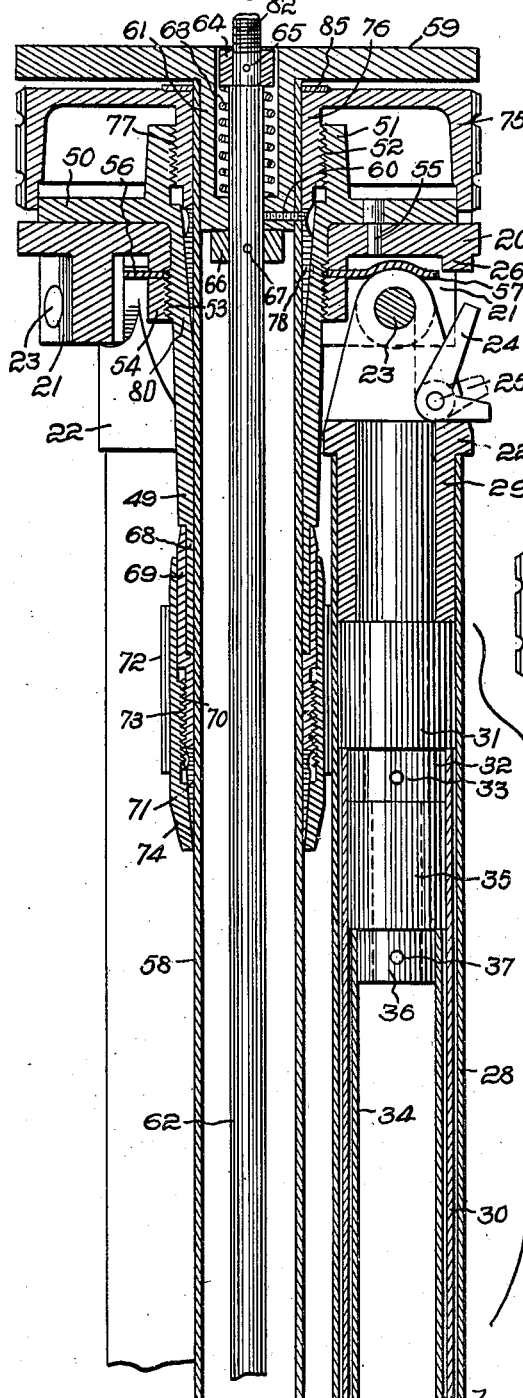
Figure 2:
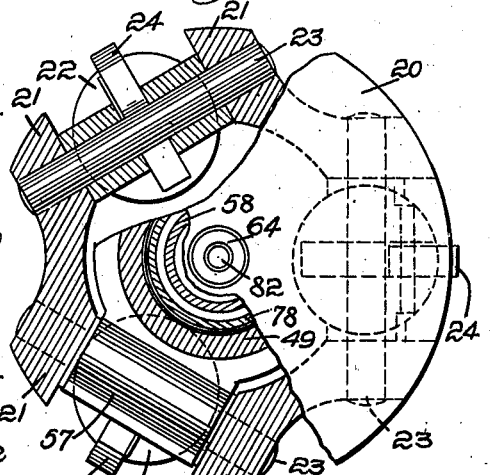
Fig. 2 is a top plan view of the tripod, partially in horizontal section, to show more clearly the construction of the several parts, particularly the leg hinges.

Referring first particularly to Figs. 1 and 2, the tripod head is represented at 20, and is therein shown as provided with substantially radially extending bosses 21, 21, to receive preferably three tripod-leg hinge members, severally indicated at 22, and each hinged to the tripod top 20 by a suitable hinge pin 23. Each of the said leg hinge members 22 is provided with a stop member 24 desirably in the shape of an integral bell crank, best indicated in Figs. 1 and 2 as hinged to the leg hinge member 22 by pin 25. The said tripod head 20 is provided with a series of pads 26, 26, the appropriate one of which is engaged by the corresponding stop member 24 when the leg hinge member is swung in a contraclockwise direction about the hinge pin 23, viewing Fig. 1.

In order to permit each tripod leg to be swung in more nearly a horizontal position, the appropriate stop member 24 is adapted to be pushed rearwardly (contraclockwise) into the position shown in dotted lines in Fig. 1, thus allowing the said stop member 24 to pass the corresponding pad 26. When the said stop member 24 is in the position shown in Figs. 1 and 5, the movement of the leg or legs of the tripod in an outward direction will be arrested by a stop or stops 24 and pad or pads 26, thus preventing any spreading of the tripod legs. Each stop member 24 being independent of the others, the stopping of the movement of each tripod leg can be effected independently of the movement of the other tripod legs. This is important when using the tripod on uneven ground or other uneven base or platform. Moreover, as is evident from Fig. 8, each of the tripod legs can be swung from the vertical position into nearly a horizontal position, as the shape of the tripod-leg hinge members 22 is such as to permit such extended movement of substantially ninety degrees upon the hinge ears 23.

Each tripod leg is designated generally at 27, and is made up of three sections, namely, the upper, the intermediate and the lower section.

The said upper tubular section is indicated at 28, and is fitted over a reduced diameter portion 29 of the corresponding leg hinge member 22, and is attached thereto in any suitable or well known manner, as, for example, by shrinking the tubular section 28 onto the reduced diameter portion 29. The said intermediate tubular section 30 is provided with a guide member or bushing 31 having a reduced diameter portion 32 fitted into the intermediate tubular section 30 and keyed thereto by means of a through-pin 33. The said lower tubular section, shown at 34, is provided with a guide member or bushing 35 having a reduced diameter portion 36 fitted into the said lower tubular section 34 and held thereto by means of a through-pin 37. The said lower section is formed as a tube of a smaller outside diameter than the inside diameter of the said intermediate section 30, but the said guide member or bushing 35 has a close fit to the inside diameter of the intermediate section 30. This construction provides a free non-binding action on the tubes as they are telescoped within each other. The structure and fitting of all the tubular sections and the guide members for all three tripod legs are desirably precisely the same, one with another.

Figure 4:
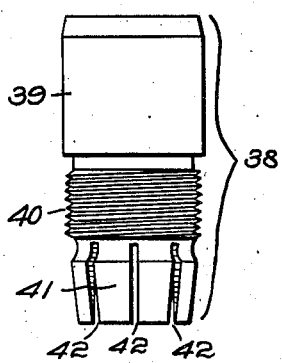
Fig. 4 is an elevational detail of one of the leg inner clutch members.

Referring particularly to Fig. 6 and also to Fig. 1, there is shown as attached to the upper section tube 28 an inner clutch member designated generally as 38 (more clearly shown in detail in Fig. 4). It is composed of a tubular section having an enlarged upper body section 39 bored out to receive the reduced diameter end 28 of the corresponding tripod leg 22. Joined with the said upper body section 39 is a threaded portion 40, and joined with such threaded portion is a conical or externally tapered clutch member 41 having a suitable number of lengthwise extending slots 42, 42. Threaded over the inner clutch member 38 is a clutch sleeve 43, the upper end whereof is bored out to override the upper end 39 of the said inner clutch member 38. The lower end of the said clutch sleeve 43 is provided with an internally tapered end formation 44 to engage the externally tapered end 41 of the inner clutch member 38. As the said clutch sleeve 43 is turned in a clockwise direction, the internally tapered formation 44 is caused to be moved upwardly on the conical or outwardly tapered formation 41 due to the action of the threaded portion 40 of the inner clutch member 38, and the internal thread 45 of the said clutch member 43, thus clamping the intermediate section provided by the tube 30 securely to the upper section tube 28. The intermediate-section tube 30 is also provided with a clutch or similar structure for the purpose of clamping the lower-section tube 34 to the intermediate-section tube 30.

It will be evident from the description thus far given of the structure that each tripod leg can be extended to any position and then be securely clamped. Since the intermediate section tube 30 is provided with a guide member or bushing 31 and the lower-section tube 34 is provided with a guide member or bushing 35, there will be practically no play or side movement in any of the said tubes or sections when the clutches therefor are in their locked position. The said guide members or bushings 31 and 35 also prevent the corresponding intermediate-section tube 30 and lower-section tube 34 from passing beyond their respective clutches.

As hereinbefore pointed out, the openings in the upper-section tube 28 and the intermediate-section tube 30 are slightly larger than the outer diameters of the intermediate-section tube 30 and lower-section tube 34 respectively, and each member or bushing 31 has an easy running fit in the upper-section tube 28, and each member or bushing 35 has an easy running fit in the intermediate-section tube 30. The said inner clutch members are of such diameter as also to provide an easy running fit on the intermediate-section tube 30 and the lower-section tube 34 respectively. Therefore, the lower-section tube 34 will be stopped by the inner diameter of the clutch member 38 by the act of engaging the member or bushing 35 when the lower-section tube 34 is withdrawn a sufficient distance. The same is true when the intermediate-section tube 30 is withdrawn a sufficient distance to engage the member or bushing 31 on the inner-clutch member 38.

To the lower end of the lower-section tube 34, as best shown in Figs. 5 and 6, is attached a removable member 46 having a knurled knob formation 47, and to the lower end of the said removable member 46 is attached a rubber foot 48. The upper end of the said removable member 46, which is engaged by the lower-section tube 34, is provided with a point (not herein shown).

The said removable member 46 can be withdrawn from the lower-section tube 34 and turned end for end, thus providing pointed ends for each of the tripod legs in a manner not necessary further to describe.

Again referring to Figs. 1 and 2, the tripod head 20 is provided with a suitable, preferably large, centrally located hole or opening through which passes a large-diameter, tubular support member 49 having a radially extending disk-like flange 50 overlying the said tripod head 20. Projecting upward from the disk-like flange 50 is a cylindrical boss 51 provided with internal threads 52. The said tubular support member 49 is also provided below the flange 50 with external threads 53 receiving a nut 54, which holds the tubular support member 49 in engagement with the said tripod head 20. In order to prevent rotation of the said disk-like flange 50 with respect to the tripod head 20, there is provided a dowel pin 55. The nut 54 also holds in position a flat ring-like spring 56 having a series of radially extending fingers 57, 57, best shown in Fig. 1, and severally adapted to impart a downward pressure on the tripod-head leg hinge members 22, 22, the number of spring fingers 57 therefore equalling the number of leg hinge members 22.

Passing through the axial opening of the tubular support member 49 is a long support tube 58 having attached to its upper end a tripod disk or support plate 59 held to the support tube 58 by means of a pin 60. The said disk or support plate 59 is provided with a downwardly extending boss 61, the lower end of which has an opening for the passage of a clamp screw rod or camera-attaching rod 62. The upper part of the said opening in the boss 61 is counterbored to receive a coiled spring 63 surrounding the said rod 62, the upper end whereof is provided with a collar 64 for retaining the spring 63 and which collar 64 is held to the said rod 62 by means of a pin 65. The upward movement of the said camera-attaching rod 62 is limited by a second collar 66 held to the said rod 62 by means of a pin 67.

The lower end of the tubular support member 49, as shown in Fig. 1, is provided with a reduced diameter portion 68 over which is fitted an inner clutch or chuck member 69 provided with an external threaded part 70 and a lower tapered end 71 having a structure preferably similar to that disclosed in Fig. 4. An outer clutch member 72 having an internal thread 73 is threaded to the said inner clutch member 69 to engage the threads 70 thereon, and the lower end of the outer clutch member 72 is provided with an internal taper 74 engaging the outwardly tapered portion 71 of the inner clutch or chuck member 69 and which is caused to tighten about the said support tube 58 when the outer clutch member 72 is turned in a clockwise direction. The said clutch serves either as a guide means that can be adjusted so as to fit closely the support tube 58 or actually to lock the position of the support tube 58. In general practice, the said clutch is adjusted to provide a close fit around the said support tube 58, but allowing the latter to operate vertically therein, thus providing a brace for the said support tube 58.

Figure 3:
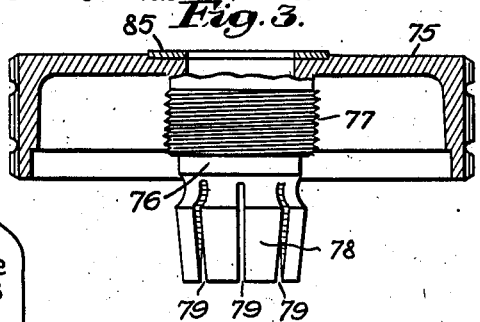
Fig. 3 represents the tripod vertical member locking nut partially in vertical section.

As best shown in Figs. 1, 2 and 3, there is threaded into the cylindrical boss 51 an upper clutch member 75 that is provided with a centrally depending tubular member 76 having a threaded portion 77 and a lower, inner clutch member 78 provided with lengthwise extending radial slots 79, 79. The vertically extending support tube 58 passes through the said lower, inner clutch member 78, and when the said upper clutch member 75 is turned in a clockwise direction, the said lower, inner clutch member 78 is caused to be closed by reason of the tapered internal formation 80 on the upper end of the vertical tubular support member 49.

As hereinbefore pointed out, the lower clutch or chuck member 69 is adjusted to provide a nice sliding fit on the support tube 58 and the upper clutch or chuck member 75 is caused to clamp securely the said support tube 52 in any selected position by the means just described.

In Fig. 5, the lower end of the vertical support tube 58 is shown as having at its lower end a handle 81 which is attached to the clamp screw rod or camera attaching rod 62 that passes through the support tube 58. As best shown in Figs. 1 and 8, the upper end of the clamp screw or camera attaching rod 62 is provided with a threaded end 82 engaging the camera or other object to be held to the tripod. In Fig. 5, there is represented a camera 83 mounted on a trippd and held by the said threaded end 82.

The structure of the clamp screw or camera attaching rod 62 is such that the slight upward pressure imparted by the coiled spring 63 causes the said rod 62 to be held in the position shown in Fig. 1, so that the threaded end 82 of the said rod 62 extends above the disk or support plate 59 for engaging the camera or other object to be supported upon the tripod. This structure provides an easy means for locating the camera attaching nut on the camera structure, over the threaded end 82 for engaging therewith. The handle 81 of the support tube 58 can then be turned in a clockwise direction, to engage the threaded end 82 with the camera nut itself, which latter is not herein shown.

When the upper clutch member 75 is turned in a contraclockwise direction, the support tube 58 can be moved vertically through the tripod head so as further to elevate the camera, as shown in Fig. 9.

It may be desirable at times to support the camera very close to the floor or ground. This can be accomplished by first loosening the upper clutch or chuck member 75, removing the vertically extending support tube 58 from the tripod head, and then reversing and inserting the said support tube 58 from the bottom of the tripod head. The said support tube 58 is then adjusted to position, and it is securely clamped by turning the said upper clutch or chuck member 75 in a clockwise direction. When the tripod is so adjusted, it will appear as shown in Fig. 7. A felt washer 85 is placed in a recess in the upper clutch or chuck member 75 to act as a bumper when the said support tube 58 is lowered.

When the camera 83 is removed from the tripod and the legs of the tripod are folded up or collapsed and the support tube 58 is in its lowermost position, the structure then appears as shown in Fig. 11.

It may be desirable to provide a tripod having the features herein disclosed but without the provision of the support tube 58, while at the same time retaining the numerous other features of the tripod. To accomplish this, I have, as shown in Fig. 8, provided a disk 86 having a downwardly extending boss 87 provided with an external thread 88. The said boss 87 is cylindrically recessed to receive a coiled spring 63 and a collar 64. The said disk 86 is held to the tripod head 20 by means of a clamping nut 89 having an internal thread 90. The said clamping nut thus clamps the spring 56 and the disk 86 securely in place to the tripod head 20. When this structure is used, the said clamping rod 62 is, of course, shortened up as shown in Fig. 8.

The tripod herein disclosed has a structure that assures absolute rigidity regardless of the position in which it is used, and provides a vertically extensible supporting member that is also held very rigidly and without any shaking even though fully extended. The entire structure can be manufactured at a reasonable cost and yet maintain a high order of precision. The tripod is an all-metal one, nothing but metal being employed, except for the felt pads and washers, which may, if desired, be omitted.

Having thus described two embodiments of the invention, it is to be understood that although specific terms are employed, they are used in a generic and descriptive sense and not for purposes of limitation, the scope of the invention being set forth in the following claims.

I claim:

1. A tripod for photographic cameras or the like comprising in combination, a tripod head having a series of legs hinged thereto so that each leg is free to be swung for use independently of all the other legs, in and out from vertical position into substantially horizontal position, and independent means to lock such leg at a predetermined angle that is materially less than the said horizontal position, regardless of the position of the other legs.

2. A tripod for photographic cameras or the like comprising in combination, a tripod head having a series of legs hinged thereto to be swung in and out, each of said legs having a bell crank locking member 24 pivoted thereto and engageable with the tripod head to hold the leg in position.

3. A tripod for photographic cameras or the like comprising in combination, a tripod head having a series of legs hinged thereto to be swung in and out, and spring means carried by the said tripod head positioned to engage and bear downwardly upon and thereby apply tension directly downwardly to the upper end of each of the tripod legs in the downward direction of the lengthwise axis of each such leg in the several positions of the legs in the use of the tripod.

4. A tripod for photographic cameras or the like comprising in combination, a tripod head having a series of legs hinged thereto to be swung in and out, a ring-like spring member 56 secured to the said tripod head and having parts respectively directly engaging the legs, so as to bear downwardly thereon with spring force, and thereby to apply pressure thereto in the downward direction of their lengthwise axis thereof, in their several positions of use.

5. A tripod for photographic cameras or the like comprising in combination, a tripod head having a series of legs hinged thereto to be swung in and out, a ring-like spring member 56 secured at the under side of the tripod head and having radial spring fingers 57 to bear respectively directly downwardly upon and apply pressure to the upper ends of the tripod legs in the downward direction of the lengthwise axis thereof.

6. A tripod for photographic cameras or the like comprising in combination, a tripod head having means to support a camera or the like for movement about an upright axis, and having a series of legs hinged thereto so that each leg is free to be swung in and out from vertical position into substantially horizontal position independently of all the other legs, and independent means for each leg to prevent such leg from spreading beyond a predetermined angle that is materially less than the said horizontal position, regardless of the position of the other legs.

7. A tripod for photographic cameras or the like comprising in combination, a tripod head having means to support a camera or the like for movement about an upright axis, and having a series of legs hinged thereto so as to be free to be swung in and out from vertical position into substantially horizontal position, each of said legs having a bell crank locking member 24 pivoted thereto and engageable with the tripod head to hold the leg in position at an angle less than such horizontal position.

8. A tripod for photographic cameras or the like comprising in combination, a tripod head having a series of legs hinged thereto to be swung in and out, each of said legs having a stop member engageable with the structure of the tripod head to prevent the legs from spreading, the said stop members of the legs being distinct from and independent of each other, so that any one or more of said stop members can be rendered active or inactive to perform the function thereof regardless of the other said stop members.

9. A tripod for photographic cameras or the like comprising in combination, a tripod head having a series of legs hinged thereto to be swung in and out, each of said legs having a stop member engageable with the structure of the tripod head to prevent the legs from spreading, the said stop members of the legs being distinct from and independent of each other, so that any one or more of said stop members can be rendered active or inactive to perform the function thereof regardless of the other said stop members, each of said stop members consisting of a lever pivoted to the respective leg and engageable or non-engageable with the tripod head in the downward swinging movement of such leg, according to the position into which such lever may be swung upon its pivot by the user of the tripod.

VERNON E. WHITMAN.